United States Patent [19]

Mehrens et al.

[11] Patent Number: 4,777,528
[45] Date of Patent: Oct. 11, 1988

[54] ERROR FREE GRATICULE MOUNT

[75] Inventors: Thomas E. Mehrens, Redwood City; Steve L. Csiker, Los Altos; Ray F. A. Pashley, San Jose, all of Calif.

[73] Assignee: Sony Corporation, Tokyo, Japan

[21] Appl. No.: 88,855

[22] Filed: Aug. 21, 1987

[51] Int. Cl.$^4$ .................. H04N 17/00; H04N 5/72
[52] U.S. Cl. ............................ 358/139; 358/250
[58] Field of Search ............ 358/139, 245, 247, 250, 358/10, 93, 305

[56] References Cited

U.S. PATENT DOCUMENTS 3,357,230 12/1967 Topaz ........................... 358/139
4,354,205 10/1982 Lowe et al. .................... 358/250

Primary Examiner—Howard W. Britton
Assistant Examiner—Victor R. Kostak
Attorney, Agent, or Firm—Philip M. Shaw, Jr.

[57] ABSTRACT

A transparent, fixed reference pattern is mounted on one side of a rigid, transparent sheet placed in front of a television monitor screen to enable an operator to more easily align an internally generated monitor display pattern with the fixed pattern during a calibration procedure. The side of the transparent sheet adjacent the monitor screen is covered with a semi-reflective material to reflect the reference pattern back through the sheet to the viewer so that the viewer, by causing the reflected pattern to align with the actual reference pattern, can ensure that his viewing position is exactly perpendicular to the sheet and the surface of the screen, thereby eliminating parallax problems. The monitor is then calibrated to make the generated pattern conform to the reference pattern.

5 Claims, 1 Drawing Sheet

U.S. Patent
Oct. 11, 1988
4,777,528
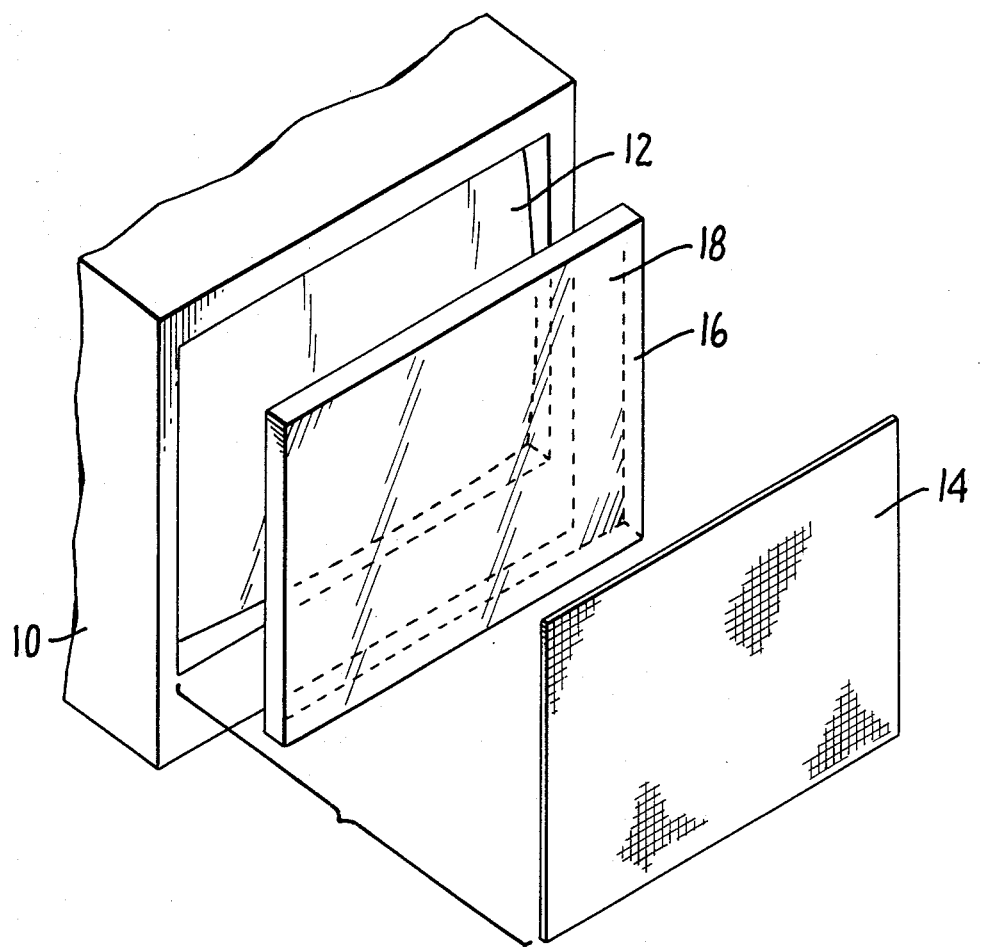

ERROR FREE GRATICULE MOUNT

TECHNICAL FIELD OF THE INVENTION

The present invention relates generally to calibration of the scanning beam deflection circuitry within a monitor display and more particularly to providing an accurate and fixed guide for such adjustments by placing an image of a pattern directly in front of the monitor display.

BACKGROUND ART

Most television monitors have curved monitor display areas. After the completion of manufacture of the monitor, when a picture is first projected on the screen, its curvature distorts the picture. The technician needs to adjust the beam deflection circuitry to provide a flat, linear image with no geometric distortions.

The calibration is usually performed by generating a pattern, typically a crosshatch pattern, on the CRT screen. This pattern is then compared to a fixed reference pattern. The fixed reference pattern can be placed on a thin film which is then attached to the surface of the monitor. Another method of providing a fixed reference pattern has been to optically project it on the front surface of the monitor. The operator then adjusts the beam deflection circuitry until all crosshatch marks from the monitor display line up with all co-ordinates of the fixed reference pattern.

The methods for providing a fixed pattern have not proved entirely satisfactory. When using a film on the monitor surface, the alignment of the film is difficult to adjust. If the film is placed on a thick, transparent plate to aid in alignment, there are parallax problems when viewing the test pattern on the screen. Optically projecting a pattern on the monitor is also clumsy to use.

SUMMARY OF THE INVENTION

The above and other problems of calibrating television monitors are overcome by the present invention of an apparatus and method for providing an accurate and fixed reference pattern comprising a relatively rigid, transparent sheet on one side of which is a reference graticule and on the other side of which is covered with a film of semi-reflective material. The transparent sheet is placed in front of the monitor screen, with the reflective side facing away from the screen. The test pattern generated on the screen is then visually compared by the technician, looking through the graticule, with the fixed reference pattern. By moving his head from side to side and up and down until the reference pattern reflected by the semireflective surface is aligned with the reference graticule, the technician can position his head exactly perpendicular to the sheet and the reference graticule, thereby eliminating parallax. The deflection circuitry is then adjusted to calibrate the monitor to make the generated image optically coincident with the fixed reference pattern on the graticule.

By dimensioning the sheet to coincide with the mounting window in the monitor for the screen, the graticule is easily aligned with the screen and the semi-reflective surface also prevents the fixed reference pattern from being reflected off the glass front of the monitor screen.

It is an object of this invention to provide a monitor calibration reference pattern limited in accuracy only by any minute imperfection of the pattern on the reference graticule.

It is another object of this invention to provide a monitor calibration reference pattern which easily eliminates the problems of parallax in viewing the reference pattern on a relatively thick, transparent surface.

It is a further object of the invention to facilitate a monitor calibration technician's job by providing a reference pattern that is both easy to align with the monitor and free from spurious reflections of the reference graticule.

The foregoing and other objectives, features and advantages of the invention will be more readily understood upon consideration of the following detailed description of certain preferred embodiments of the invention, taken in conjunction with the accompanying drawing.

BRIEF DESCRIPTION OF THE DRAWINGS

FIG. 1 is an exploded, perspective view of a monitor together with a graticule and mounting means therefor in accordance with the invention.

DETAILED DESCRIPTION OF THE PREFERRED EMBODIMENT

FIG. 1 shows a two-sided transparent sheet of plastic 16 in front of a television monitor 10. Any material that is flat, rigid and transparent may be used for the transparent sheet 16. The monitor has a display screen upon which is generated a cross-hatched reference pattern 12. The transparent sheet 16 has dimensions at least as large as the monitor's display dimensions and is usually more than ¼" thick. The side of the transparent sheet closest to the monitor 10 has a semi-reflective surface 18 with the reflective or shiny side of the surface facing towards a reference pattern or graticule 14 on the opposite side of the sheet.

The semi-reflective material 18 preferred is a silvered polyethylele terephthalate (sold by DuPont under the trademark Mylar) which is commonly used in solar reflective window coverings. This material allows the monitor's pattern 12 to be visible to the viewer but keeps the image of the reference graticule 14 from passing through to the monitor and reflecting off the monitor's display screen. When the viewer's head is positioned exactly perpendicular to the transparent sheet 16, the reference graticule 14 will exactly cover its reflection on the semi-reflective material 18 and at the same time eliminate parallax caused by the thickness of the transparent sheet 16.

The sheet 16 is dimensioned to fit in the bezel of the monitor to correctly position it with respect to the display screen or it can be attached to the monitor by feet commonly used to attach glare screens to CRTs.

Although the present invention has been shown and described with respect to preferred embodiments, various changes and modifications which are obvious to a person skilled in the art to which the invention pertains are deemed to lie within the spirit and scope of the invention.

What is claimed is:

1. A graticule mount for comparison by an observer with a pattern generated on a television monitor screen comprising:

(a) means for optically defining a flat reference pattern;

(b) measns for supporting the flat reference pattern parallel to and at a predetermined distance from the monitor screen;

(c) a semi-reflectiv esurface; and (d) means for mounting said semi-reflective surface betweem the means for optically defining the flat reference pattern and the monitor screen and parallel with said monitor screen such that the semi-reflective surface is adjacent to, but faces away from the screen whereby the pattern generated on the screen is viewable through the reference pattern and the reference pattern is reflected by the semi-rfeflective surface back to the observer.

2. A graticule mount for comparison by an observer with a pattern generated on a television monitor screen comprising:

(a) a flat, rigid, transparent sheet having a reference pattern on one flat side thereof and a semi-reflective surface on the opposed flat side thereof;

(b) means for mounting said sheet parallel with said monitor screen such that the semi-reflective surface is adjacent to, but faces away from the screen whereby the pattern generated on the screen is viewable through the reference pattern and the reference pattern is reflected by the semi-reflective surface back through the sheet to the observer.

3. The invention as claimed in claims 1 or 2 wherein said transparent reference pattern corresponds to said pattern generated on the screen so as to facilitate calibration of the monitor by the observer.

4. A graticule mount for comparison of an internally projected pattern on a display screen with a fixed, external pattern, said graticule mount comprising:

(a) a flat, rigid, transparent sheet having two sides;

b) a film of semi-reflective material mounted on one of said sides and a reference pattern on the other of said sides; and (c) means for accurate and stable aligning of said flat, transparent sheet with respect to said display screen such that the pattern projected on said display screen is viewable through said transparent sheet and said semi-reflective material faces away from said display screen whereby an operator, by correct positioning of his head relative to the transparent sheet can cause the reflected image of the reference pattern from the semi-reflective surface to be aligned with the reference pattern thereby ensuring that his head is perpendicular with the transparent sheet.

5. A method of calibrating a television monitor comprising the steps of:

(a) generating a pattern on the monitor screen;

(b) placing a rigid, transparent sheet having a reference pattern on a flat, front side thereof and a semi-reflective surface on the opposed, flat, back side thereof in front of the screen and aligned with it, with the semi-reflective surface facing the reference pattern on the front side of the sheet and away from the screen;

(c) positioning one's viewing point of the front side of the sheet until the reference pattern reflected through the sheet by the semi-reflective surface appears to coincide with the actual reference pattern on the front side of the sheet;

(d) viewing the pattern on the monitor screen through the transparent reference pattern and calibrating the monitor to make the generated pattern appear coincident with the transparent reference pattern.

* * * * *